April 4, 1950 E. GOLDBERGER 2,502,517

TELEPHONE CALL TRANSMITTER WITH DIGIT INDICATING MECHANISM

Filed April 10, 1946 4 Sheets-Sheet 1

INVENTOR.
Emanuel Goldberger
BY
Michael S. Striker
his agent

April 4, 1950

E. GOLDBERGER

TELEPHONE CALL TRANSMITTER WITH DIGIT INDICATING MECHANISM 2,502,517 led April 10, 1946

4 Sheets-Sheet 2

INVENTOR.
Emanuel Goldberger

BY
Michael S. Striker
his agent

April 4, 1950 E. GOLDBERGER 2,502,517
TELEPHONE CALL TRANSMITTER WITH
DIGIT INDICATING MECHANISM
Filed April 10, 1946 4 Sheets-Sheet 3

INVENTOR.
Emanuel Goldberger
BY
Michael S. Striker
his agent

April 4, 1950 E. GOLDBERGER 2,502,517

TELEPHONE CALL TRANSMITTER WITH DIGIT INDICATING MECHANISM

Filed April 10, 1946 4 Sheets-Sheet 4

INVENTOR.

Emanuel Goldberger

BY Michael S. Striker his agent

Patented Apr. 4, 1950

2,502,517

UNITED STATES PATENT OFFICE 2,502,517

TELEPHONE CALL TRANSMITTER WITH DIGIT INDICATING MECHANISM

Emanuel Goldberger, Basel, Switzerland

Application April 10, 1946, Serial No. 660,918
In Switzerland March 10, 1945

9 Claims. (Cl. 179—90.2)

My invention relates to a telephone apparatus for preselection of telephone numbers and indication of the preselected telephone number, and comprises an impulse transmitter of a standard type operated by a rotatable fingerwheel dial, provided with circular finger receiving openings, corresponding to various characters, numerals or letters; a mechanism for actuating the numeral discs on the indicating device can be made to engage or disengage by a clutch an indicating device consisting of several discs provided with numbers or letters and placed side by side on a common shaft in such a way that the telephone number appears on the indicating device as it is dialled by the operator on the dial and can be checked before the transmission of the impulses to the exchange is carried out and independently from it; a group of levers with contact strips of an additional impulse producer which, on pressing a push button, receives current and transmits a number of impulses and the passage of these impulses to the exchange is controlled by a single impulse selecting disc which is provided with several contact segments and switches effecting the selection and transmission to the exchange of a number of impulses which correspond to the number dialled by the dial and indicating on the indicating device.

The transmission of these impulses to the exchange can be effected at any time after the dialling and repeated as many times as desired from the moment when the number appears on the indicating device. After establishing a connection, the indicating device, the additional impulse producer, the impulse selecting disc with its contact segments and switches, the levers with contact strips are again ready for operation as soon as the impulses have been transmitted to the exchange and the connection with the dialled number can be reestablished as many times as desired by pressing a push button.

In automatic telephone systems, the telephone connection with any number of the system is established by electrical impulses transmitted to the exchange. The impulse transmitter is built into a housing and coupled with a fingerwheel dial which has circular openings for receiving fingers and under these openings there are numbers or letters printed. The dialling disc has ten openings through which the mentioned letters and figures are visible. The number is dialled by placing the finger into an opening corresponding to the first cifer, turning the disc clockwise to the stop, and releasing it. A built-in spring pulls the disc back into its original position and the impulse producer generates and transmits a number of impulses to the exchange corresponding to the dialled first cifer or letter of the number. For the second and subsequent numbers, the process is repeated until the whole number is dialled and the telephone connection is thus established, provided neither the exchange nor the desired number are engaged.

This system has the disadvantage that the dialling cannot be effected independently of establishing the telephone connection, the dialled number does not appear visibly and there is no possibility of checking the correctness of the dialled number before the connection is established. It is therefore a frequent occurrence to dial and obtain undesired connection. Also if a number is engaged during the dialling, the whole dialling process has to be repeated.

Systems have been proposed where the desired numbers are set and made visible by movable number levers, turning knobs, push buttons, etc.

These systems could not be introduced for practical application because the method of setting of the numbers differs basically from the universally applied method of setting the numbers by a circular finger wheel dial.

It has also been proposed to make a number visible as it is dialled. This method has the disadvantage that the number can only be checked when it is too late, i. e. when the connection has already been established.

The described invention enables an operator to dial with the finger wheel dial any desired telephone number in the same manner as in a standard automatic telephone system, the dialling operation being independent from the establishing of the telephone connection, whereby the dialled number can be seen and its correctness checked. The connection with the once dialled number can be reestablished any time after dialling and repeated as many times as desired by operating a push button which actuates an additional impulse producer, a group of control levers, a single selecting disc provided with a number of contact segments and switches.

My invention can be better understood by reading the detailed description which follows and the enclosed drawings.

*Number indicating device*

Figures 1, 2:
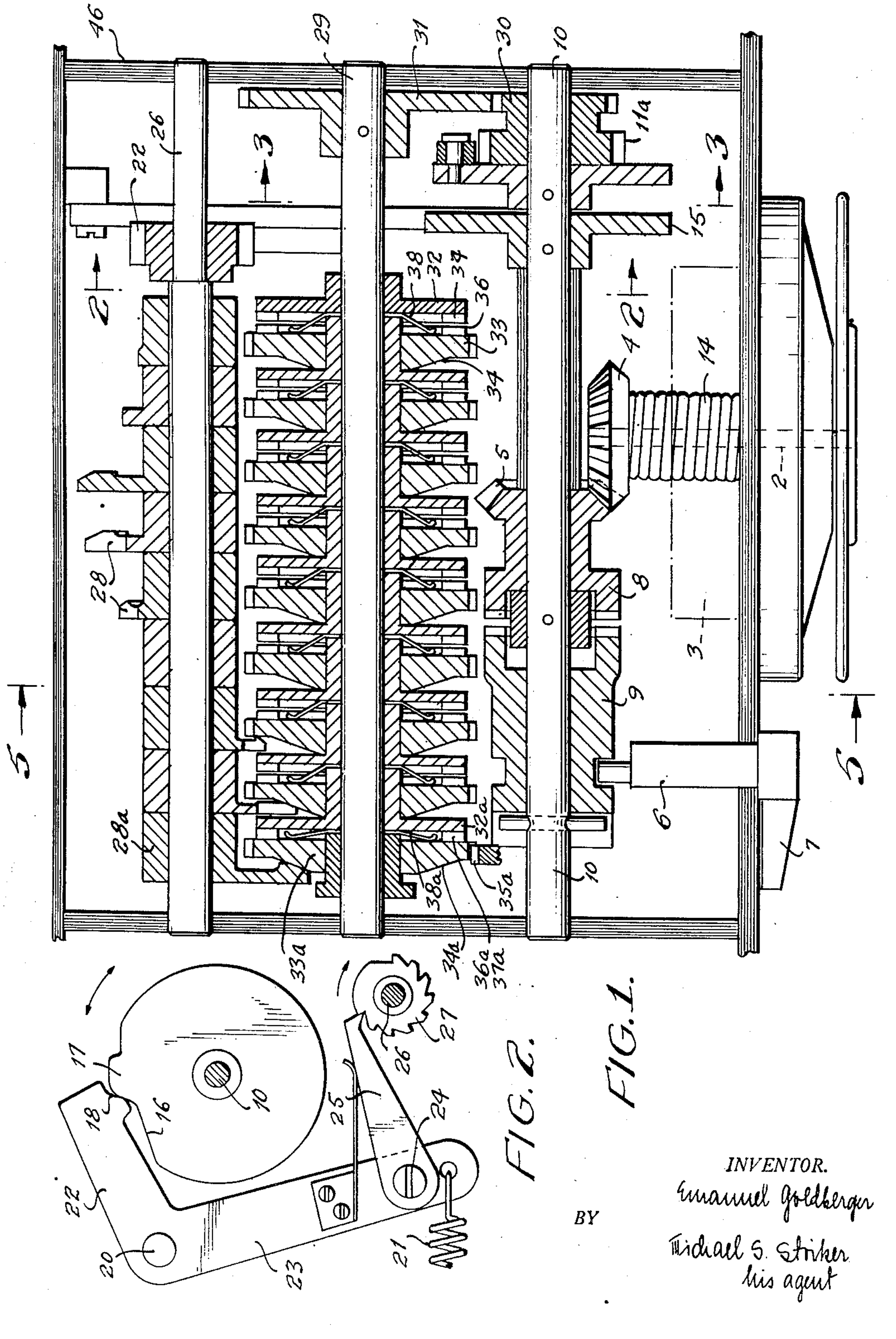
Fig. 1 is a section I'—I''—I'''—I'''' through the telephone apparatus, Fig. 5.
Fig. 2 is a part section along II—II of Fig. 1.
Figures 5, 6:
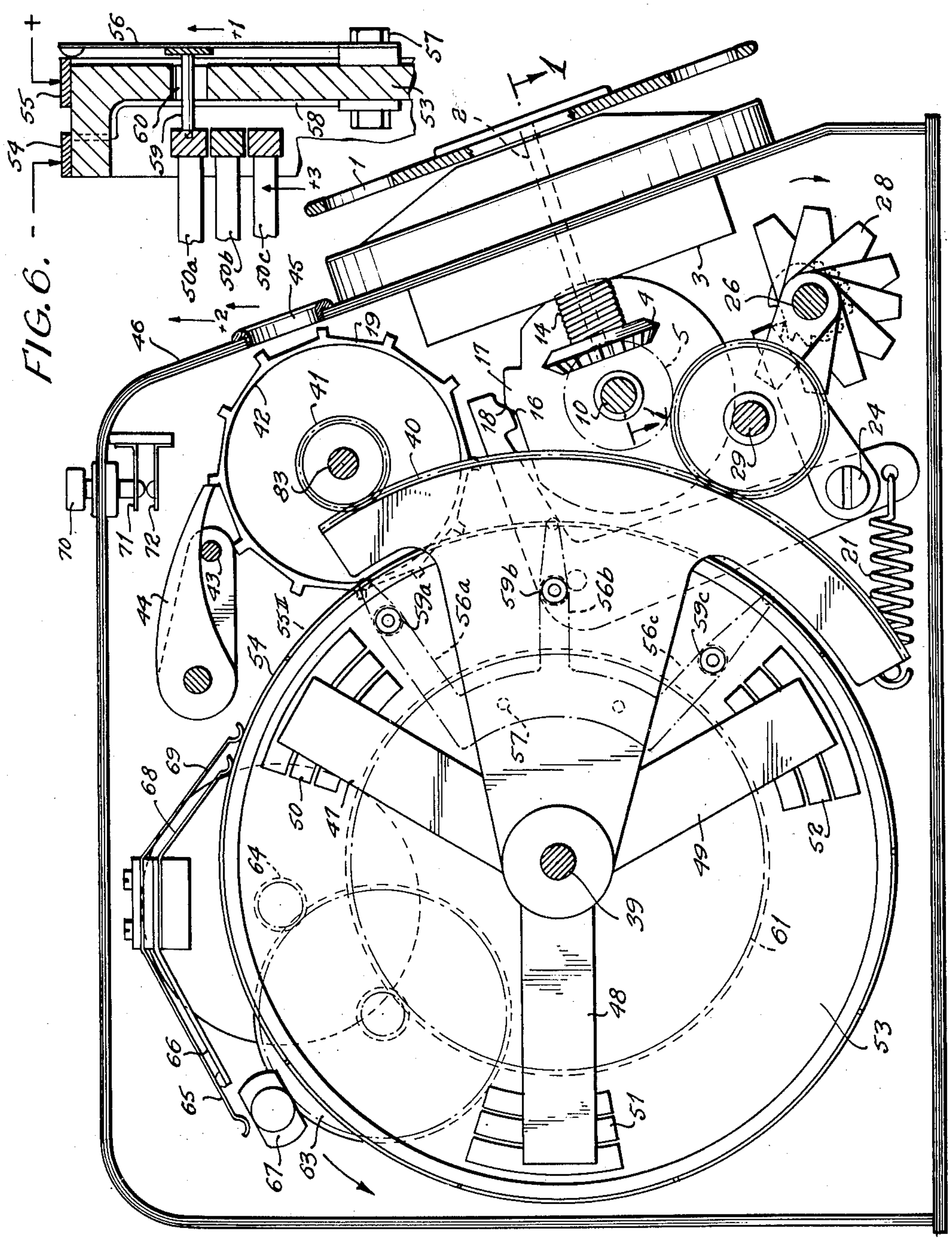
Fig. 5 is a section through the telephone apparatus along line IV—IV in Fig. 1.
Fig. 6 is a section through the selecting disc, contact segment and switches.

A standard type telephone impulse transmitter 3 with a standard finger wheel dial 1 representing ten different sets of numbers and letters is fitted on the housing 46 (Fig. 5). The shaft of this impulse transmitter is prolongated 2, and fitted with a bevel gear 4 which engages the bevel gear 5 which is loosely fitted on shaft 10. The bevel gear 5 engages a gear tooth type clutch the other half of which is pinned on the shaft 10 and is slidably mounted (Fig. 1). The sliding of the half coupling 9 is effected by an eccentrical pin 6, operated by a lever 7 which is fitted on the outside of the housing 46. The clutch 9 is engaged or disengaged with 8 according to the position of the lever 7. According to the position of the lever 7 and the pin 6 controlled by it, the dial movement is transmitted to the shaft 10 or the whole mechanism in the housing 46 is disengaged. This enables to operate the dialling and making the connections in the conventional manner like it is done in any standard apparatus by turning the lever 7 into a position to effect disengaging of clutch 9, thus disengaging the whole indicating mechanism if it is desired to dial without the operation of the indicating device. This position is indicated in the drawing (Fig. 1).

When the clutch 8 and 9 engages, the movement of the fingerwheel dial is transmitted to the shaft 10 in both directions, i. e. to the right when the dial is operated and in the opposite direction when the dial reverts to the zero position by spring 14 action after the disc is released.

The movement of the shaft 10 is transmitted to the shafts 26 and 29.

By using a mechanism shown in Fig. 3 and described later, the shaft 29 and the tooth gear type couplings mounted thereon (32*a*, 32*b*, 32*c*) rotate only in one direction and the angle of rotation corresponds to the angle of rotation of the dial, i. e. to the dialled number or letter and is correspondingly large or small.

Simultaneously, a mechanism shown in Fig. 2 and to be described later, moves the shaft 26 and the pressure arms fitted along a spiral shape curve thereon and relative to each other (28*a*, 28*b* and 28*c*) by 30° irrespective of the angle of rotation of each operation of the dial, the dial disc i. e. irrespective of the dialled number.

Figures 3, 7, 8, 10:
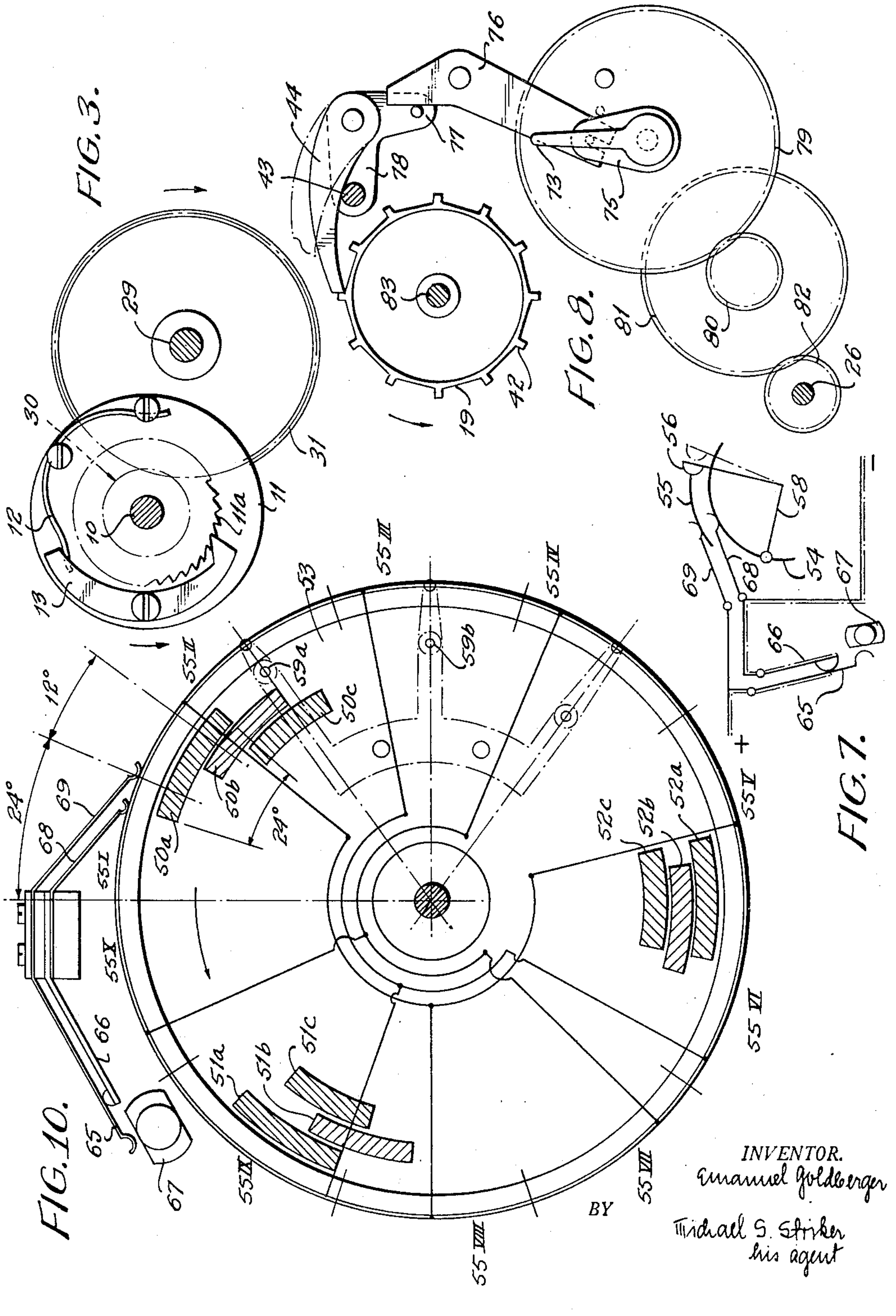
Fig. 3 is a part section along III—III of Fig. 1.
Fig. 7 is a schematic representation of the impulse current flow of the additional impulse producer.
Fig. 8 is a view of the mechanism for cancellation of dialled numbers.
Fig. 10 is a view of the selecting disc with the control arms if a telephone number is visible on the indicating device.

The mechanism shown in Fig. 3 has the function to effect movement of shaft 29 and the gears 30 and 31 in one direction only when the shaft 10 moves in any direction. A disc fitted with a ratchet 13 and spring 12 is mounted in shaft 10. The disc 11 is rigidly fixed on the shaft 10 and moves in both directions with the shaft; a gear 30 is fitted loosely on the shaft and coupled to the ratchet wheel 11*a*. This ratchet wheel 11*a* is so designed that if the shaft moves in the direction of the arrow (Fig. 3), the ratchet 13 effects the movement of the ratchet wheel 11*a*, the gears 30 and 31 and the shaft 29 in the same direction. If, however, the shaft 10 moves in opposite direction, the ratchet lever 13 slides along the teeth of the ratchet wheel 11*a* and the gears 30 and 31 and the shaft remain still.

The mechanism shown in Fig. 2 has the function to advance the shaft 26 in one direction when the shaft 10 rotates in any direction. It is important that this advance is effected at the beginning of the rotary movement of the dial, i. e. of the shaft 10, and at the end of the reverse movement (in left hand direction) the advance being 15° at each time.

A curve disc 15 with a cam 17 and a recess 16 (Fig. 2) is fitted on shaft 10. The cam 17 controls the position of the projection 18 of the lever 22 and 23 the axis of rotation of which is 20. The lever 23 is always under the action of the tension of the spring 21, which effects a permanent contact between the lever projection 18 and the curve disc 15, 16 and 17. A ratchet arm 25, which is subject to spring pressure, is mounted on lever 24 and its axis of rotation is 24. It engages into the ratchet 27 which is fixed on the shaft 26.

The ratchet has the division of 12×30° and its function is as follows: At the beginning of the movement of the dial, effected by the finger of the operator and the shaft 10, the disc 15 moves left in the direction of the arrow. The cam 17 pushes the projection 18 of the lever 22 upwards, thus the ratchet lever 25 effects the advance of the ratchet 27 and the shaft 26 on which the ratchet is fixed by 15° in clockwise direction, as indicated by the arrow in Fig. 2. After the rotary movement of the dial by the operator, the reversion is effected by spring 14 and the shaft 10 rotates clockwise. At the end of the reversion, the cam 17 of the disc 15 pushes the projection 18 upwards again and the ratchet 27 and the shaft 26 are again advanced by 15° in clockwise direction.

A multitude of tooth gear clutches 32*a*, 32*b*, 32*c*, etc., are fitted on the shaft 29, the number of which corresponds to the number of figures or letters of the telephone system concerned, i. e. seven in the U. S. A., Great Britain and France, Nine in Switzerland, up to eleven in Holland. In the example shown in the drawings, nine clutches are drawn. These clutches engage with the gears 33 which are loosely mounted on the shaft 29 and also have clutch teeth 36. These tooth gears 33 have an oblique sliding surface 34. A flat spring 38 pushes the gear 33 away from the tooth clutch 32 so that the clutch parts 36 and 37 are disengaged normally in the rest position. Only when the control arm 28 presses on the sliding surface 34 the gear 33 is pushed inwards and the parts 36 and 37 of the tooth gear type coupling engage.

A number of control arms 28 are fitted on the shaft 26, and each of these arms is displaced from the previous one by 30° showing a spiral shape (Fig. 5). These control arms come into contact with the sliding surfaces 34 of the successive gears 33 as the shaft 26 rotates. At the beginning of the dialling of the first number with the dial 1, the first control arm 28*a* comes into contact with the first tooth gear 33*a* after displacement of the shaft 26 by 15°, and the movement of the shaft 29 is transmitted through the first gear 33*a*. The reversion movement of the dial disc effects a displacement of the shaft 26 by a further 15°, the first control arm slides off the sliding surface 34a of the tooth gear 33a and the clutch is disengaged through the action of the spring 38a.

When the dialling of the second figure of the telephone number begins, the shaft 26 is displaced by a further 15° and the second control arm 28b touches the sliding surface 34b of the tooth gear 33b and engages the second tooth gear 33b with the tooth type clutch 32b, thus the movement of the dial is now transmitted through the tooth gear 33b. This process is repeated until all the figures of the number are dialled and the movement of the dial disc for each following figure of the telephone number is further transmitted by the successive tooth gear 33.

Each of the gears 33a, 33b and so on engage with one tooth gear segment 40a, 40b, etc., thus the movement of the tooth gear 33a is transmitted to the tooth segment 40a and so on. Numerous number discs 42 are loosely mounted on the shaft 83, the number corresponding to the maximum number of figures of the telephone system concerned (nine in the given example). The discs are provided with twelve slots 19, displaced from each other by 30°; these slots are provided with figures 1 to 0 or with letters and two of the slots remain blank. The number discs 42 are coupled to pinions 41 which permanently engage with the respective tooth segment 40, so that the movement of the individual tooth segment is transmitted to the respective number disc 42. The gear ratios are so chosen that the angle of rotation of the dialling disc, transmitted through the bevel gears 4 and 5, the pinions 30, 31, the gears 33, tooth segment 40 and pinion 41, corresponds accurately to the rotary movement of the number discs 42. The angle of rotation of the number disc 42 thus corresponds exactly to the angle of rotation of the dial 1, and the number or letter which appears in the aperture 45 of the housing 46 (Fig. 5) corresponds to the number or letter under the openings of the dial disc which has been operated by the finger of the operator. The number disc 42 is held in its displaced position by a loosely mounted catch 44.

The number indicating device therefore functions as follows: The operator wants to dial a telephone number which consists of several numbers or letters. The first number or letter is dialled by placing the finger in the appropriate hole and turning the disc until the stop is reached. The angle of rotation corresponds to the number or letter dialled and is transmitted through the bevel gears 4 and 5 to the shaft 10. This movement is transmitted to the shaft 29 through the disc 11, ratchet 11a, ratchet lever 13 and gears 30 and 31. Simultaneously, the beginning of the rotary movement is transmitted to the curve disc 15 and cam 17 acts on projection 18, lever 22 and 23 and the ratchet arm 25, effecting an angular displacement of the ratchet and the shaft 26 by 15°. This displacement causes the first control arm 28a to come into contact with the sliding surface 34a of the first tooth gear 33a, pushing it to the right and effecting engagement of the tooth gear type clutch parts 36a and 37a (Fig. 1). The rotary movement of the shaft 29 is therefore transmitted by the gear 33a to the first tooth segment 40a and from there to the tooth gear 41a which displaced the first number disc 42a by the same angle as the angle of rotation of the dial effected by the finger movement. For that reason the first number or letter appears in the aperture 45.

The reversion of the dial 1 is effected by the spring 14 and at the end of the reversion movement the lever 22 and 23 is again made to displace the ratchet 27 and the shaft 26 by a further 15°. This angular displacement effects the disengagement of the clutch parts 36a and 37a.

The shaft 29 remains still during the reversion movement of the dial.

During dialling of the second letter or figure of the number, the process is repeated, but there is a difference, the second control arm 28b gets now into contact with the sliding surface 34b of the gear 33b and the clutch 36b and 37b is made to engage; thus, the movement of the dial is transmitted to the second tooth segment 40b and from there to the pinion 41b and number disc 42b, and the second letter or figure appears in the aperture. The process is repeated until all the parts (letters and figures) of the dialled number appear in the aperture 45, and these can then be checked before the actual telephone connection is established.

*Additional impulse producer*

The additional impulse producer consists of a small motor which drives permanently the circuit breaker 67, as soon as current is fed into it. The movement is transmitted from the motor to the circuit breaker by a gear transmission 63 and 64 (Fig. 5 top left). When the circuit breaker 67 is rotating, the circuit between the contacts 65 and 66 is broken twice each revolution, thus producing two impulses per revolution. The pinion 62 drives the gear wheel 61 which is connected to the impulse control disc 53. This control disc makes exactly one revolution (360°) to establish a telephone connection, as will be described later. The gear ratio of the gears 61—64 is so designed that 150 impulses are produced at each revolution of the disc 53.

The sliding contacts 68 and 69 are connected electrically to the contacts 65 and 66, the sliding contact 68 is permanently in contact with the ring 54 and sliding contact 69 with the contact segments 55, which are both 54 and 55 fitted on the disc 53.

*Impulse selecting device*

The purpose of the impulse selecting device is to transmit into the exchange only those impulses which correspond to the telephone number set by dialling and thus to establish the connection with the telephone number indicated by the indicating device. The characteristic feature of the mechanism of this invention is that only one impulse selection disc is required for the selection of the impulses.

The circuit diagram of the impulse selecting device is shown in Fig. 7 and will be explained further on in greater detail.

The impulses produced by the contact pair 65, 66 through the action of the circuit breaker 67 are either transmitted to the exchange or they are suppressed. If the impulses are transmitted to the exchange, the circuit is as follows:

From + (positive) to contact 65, contact 66 — (negative) and into the exchange. If the impulses are suppressed, they are not transmitted to the exchange, but short circuit through the contacts 69, segment 55, contact 56, leads 56, leads 57, 58 to ring 54 and through contact 68 to — (negative). The impulses are transmitted to the exchange only when the electric connection between the segment 55 and the contact 56 is interrupted, i. e. if the pin 59 is lifted by the control strips 50$a$, $b$, $c$, 51$a$, $b$, $c$ and 52$a$, $b$, $c$.

The disc 53 is fitted with a switch situated in the starting position. This switch closes the power supply circuit to the motor 64 and interrupts the circuit automatically when the disc 53 is again in the starting position, i. e. after one full revolution. These contacts are not shown on the drawings because they are not characteristic of the invention and a different design of contacts could also be used.

Tooth segments 40$a$, 40$b$, 40$c$ are loosely fitted on the shaft 39 and each of these tooth segments is connected with a carrier arm 47$a$, $b$, $c$, 48$a$, $b$, $c$, 49$a$, $b$, $c$, the end of which is bent by a right angle and each carrying the control strip 50$a$, $b$, $c$, 51$a$, $b$, $c$, and 52$a$, $b$, $c$. The control strips are arranged in groups of three, and the individual control strips of each group are situated one above the other on different radii. Similarly, the individual groups are spaced at a certain angle (108° in the present case), from each other.

The disc 53 is so mounted on shaft 39 that it can rotate freely and is electrically insulated from it; in the present case 55I to 55X, i. e. ten segments. The ring 54 and the segments 55 are electrically connected by the following circuit elements: The interconnected lateral contact springs 56$a$, $b$, $c$, screws 57 and lead 58. The contact springs 56$a$, $b$, $c$, are provided with contact pins 59$a$, $b$, $c$, spaced in the present case at 36° from each other and situated at different radii. These pins are designed to project into the zone of the control strips 50$a$, $b$, $c$, 51$a$, $b$, $c$, and 52$a$, $b$, $c$; the holes 60 are provided for that purpose. When the disc 53 revolves, the pin 59$a$ gets into contact with the control strips 50$a$, 51$a$, and 52$a$, and is lifted by the control strips, thus effecting the interruption of the circuit between the ring 54 and the segments 55. The same applies to the pin 59$b$ and the control strips 50$b$, 51$b$, 52$b$ and between the pin 59$c$ and the control strips 50$c$, 51$c$, and 52$c$.

There is a permanent connection between segment 55I and ring 54 and there are also permanent connections between the segments 55II, 55V and 55VIII, 55III—55VI—55IX, and 55IV—55VII and 55X.

Figures 4, 9:
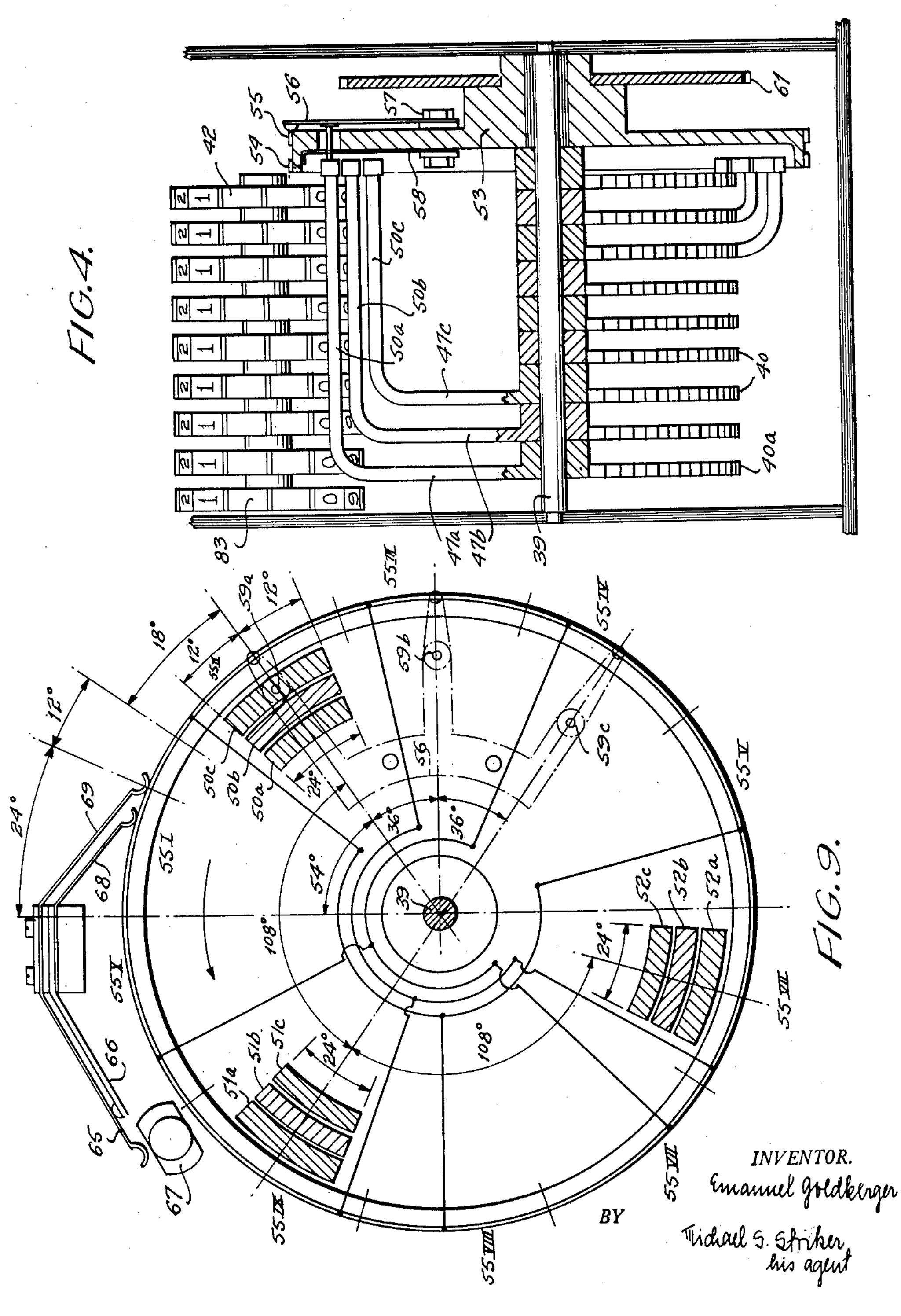
Fig. 4 is a part view of the indicating device with a section of the selecting disc, the contact segments, switches and control arms.
Fig. 9 is a view of the selecting disc with the control arms if a telephone number is not visible on the indicating device.

Fig. 9 shows the position of the control strips 50, 51, 52 and the pins 59$a$, $b$, $c$ relative to each other; the figure also shows the arrangement of the segments for the chosen example of an apparatus for a nine-figure telephone number. A different arrangement can be made for seven-figure apparatus.

If there is no number setting visible in the appropriate opening, i. e. the tooth segments 40 and contact strips 50, 51 and 52 are not displaced from their respective zero positions, impulses are produced during the rotary movement of the disc 53 in anti-clockwise direction (direction shown by the arrow in Fig. 5) as soon as the power circuit of the motor is closed, but these impulses are suppressed by the court circuit between contact 68 and ring 54 through segment 55, lead 58, screws 57 and contact 56.

At the beginning of the rotary movement of the disc 53 in the direction indicated by the arrow, the sliding contact 69 is in contact with segment 55I and 12° from the segment 55II. As the segment 55I is permanently connected, electrically, with the ring 54, the first five impulses are suppressed (one impulse=360/150=2.4°). As soon as the segment 55II gets into contact with the sliding contact 69, the pin 59$a$, which in the meantime has also moved by 12° in the same direction as the disc 53, slides off the control strip 50$a$, thereby closing the circuit between 55II and the ring 54. All the impulses produced are therefore suppressed as well as long as the sliding contact 69 slides on the segment 55II. When the sliding contact 69 gets 12° before the edge of the segment 55III, the pin 59$b$ is exactly in the center below the control strip 50$b$, and after further movement by 12°, i. e. when the contact 69 begins to slide on the segment 55III, the pin 59$b$ is released and all impulses produced during the period of sliding of the sliding contact 69 on the contact segment 55III are short circuited and their transmission to the exchange is thus prevented. The pin 59$c$ and the control strip 50$c$ work in the same way as has been described above, when the sliding contact 69 slides on the segment 55IV. At a disc position 12° before sliding contact 69 contacts the segment 55V, the pin 59$a$ is in the center of the control strip 51$a$ and is lifted up by this strip, but is released again after further rotation of the disc by 12° whilst sliding contact 69 slides on the segment 55V. The function of the segments 55VI to 55X is the same as has been described above, and, as has already been mentioned, the segments 55II, V and VIII are electrically interconnected and so are the segments 55III, IV and IX, and also the segments 55IV, VII and X.

If there is a number sitting, visible on the aperture 46, the tooth segments 40 and the respective control strips 50, 51 and 52 have angular displacements in anti-clockwise direction and, as has already been mentioned above, the individual displacement angles depend on the respective figures of the dialled number, i. e. for smaller figures the displacement is correspondingly smaller than for large figures. The pins 59 are pushed in later, according to the set angle of displacement of the control strip, and thus the connection is interrupted later. As soon as there is no short circuit, the produced impulses are no more suppressed but transmitted into the exchange. The result of this is that for a figure 1 of the dialled number one impulse is passed into the exchange, for a figure 2, two impulses, etc., the rest of the produced impulses are suppressed; for the figure 0 ten impulses are passed to the exchange and the rest are suppressed. The contact period between the sliding contact and each sector is timed to 15 impulses, from which five impulses must be suppressed under all circumstances to obtain a time interval between two subsequent figures of a telephone number which is considered favorable for the working of the equipment of the automatic exchanges.

Fig. 10 shows the position of the control strips 50, 51 and 52 relative to the pins 59, at the moment when the disc 53 begins to rotate, when there is a number setting on the number indicating mechanism, e. g. the dialled number 051284868; the control strip displacement corresponds to the figures of the dialled number, e. g. the control strip 50$a$ by 24° (0), 50$b$ by 12° (5), 50$c$ by 2.4° (1), 51$a$ by 4.8° (2), 51$b$ by 19.2° (8), 51$c$ by 9.6° (4), 52$a$ by 19.2° (8), 52$b$ by 14.4° (6), 52$c$ by 19.2° (8). The control strips are displaced in anti-clockwise direction.

At the beginning of the rotary movement of the disc 53 in anti-clockwise direction, the sliding contact 69 rests on the segment 55I, and 12° distant from the edge of the segment 55II. The segment 55I and the ring 54 are permanently interconnected and therefore the first five impulses are suppressed.

The pin 59*a* reaches the edge of the control strip 50*a* only after the disc 53 has moved by further 12°, is lifted and remains in that position for a period of 24° of the disc rotation, i. e. from the 15 impulses produced during the sliding of sliding contact 69 on the segment 55II, five impulses are suppressed and ten impulses are passed on to the exchange. These ten impulses correspond to the first figure 0 of the telephone number set by dialling.

At the moment when the sliding contact 69 begins to slide on the segment 55III, the pin 59*b* is in the center of the displaced control strip 50*b* and remains in the uplifted position for a period of five impulses (12°), after which the pin is released, thus reestablishing the connection between segment 55III and ring 54 and the remaining ten impulses are suppressed. The five impulses passed on to the exchange correspond to the figure five or the telephone number.

When the contact 69 begins to slide on segment 55IV, the pin 59*c* is in a position 12° displaced from the middle of the center line of the original control strip position. As the control strip is displaced by 2.4° anti-clockwise, the pin remains pushed in for the duration of one impulse only and the remaining impulses are suppressed. The one impulse is passed on to the exchange and corresponds to the third figure of the dialled telephone number.

When the contact 69 starts to slide on the segment 55V, the pin 59*a* is situated under the control strip 51*a* and displaced by 12° from the original center line position of the control strip. As the control strip 51*a* is displaced by 4.8° from its original position, the pin 59*a* remains pushed in for the duration of two impulses and the rest of the impulses are suppressed. The two impulses are passed into the exchange and correspond to the fourth figure of the telephone number set by dialling.

At the moment when the sliding contact 69 contacts the edge of the segment 55VI, the pin 59*b* is under the control strip 51*b* at a position 12° displaced from the original center line of the control strip. As the strip 51*b* is displaced by 10.0° from its original position, the pin remains pushed in the duration of eight impulses, and the rest of the impulses are suppressed. These eight impulses correspond to the fifth figure of the telephone number set by dialling and are transmitted to the exchange.

The same process is repeated for the subsequent figures of the telephone number; segment 55VII works in conjunction with pin 59*c* and control strip 51*c*, segment 55VIII in conjunction with pin 59*a* and control strip 52*a*, segment 55IX in conjunction with pin 59*b* and control strip 52*b* and segment 55X in conjunction with pin 59*c* and control strip 52*c*. The series of impulses corresponding to the latter figures of the telephone number set by dialling (4, 8, 6, 8 in the given example) are thereby transmitted to the exchange.

A telephone connection is established by pressing the push button 70. The pressed push button closes the contacts 71 and 72 and effects the closing of the power circuit of the electric motor 64. The circuit breaker 67 (mounted on the shaft of the motor) produces impulses continuously. Simultaneously, the disc 53 is driven by the gears 61, 62 and rotates in anti-clockwise direction. The first tooth segment 40 and the control strip 50*a* is displaced in anti-clockwise direction by an angle which corresponds to the first figure of the dialled telephone number. When the sliding contact 69 slides on the second segment, 52II, the generated impulses are suppressed until the contact pin 59*a* is lifted up by the control strip 50*a*. As soon as the pin 59*a* is lifted up by the control strip, the rest of the impulses produced during the sliding of the sliding contact 69 on segment 55II correspond exactly to the first figure of the dialled telephone number and are transmitted to the exchange. During the further rotation of the disc 53 the sliding contact 69 slides on the third segment. The produced impulses are again suppressed until the contact pin 59*b* is lifted up by the control strip 50*b*, the displacement of which is in direct relation with the figure set by dialling. The rest of the impulses produced during the sliding of 69 on the third segment correspond to the second figure of the dialled number and are transmitted into the exchange. Similarly, when the contact 69 slides on the fourth segment, the impulses are suppressed until the contact pin 59*c* is lifted up by the control strip 50*c*. The rest of the impulses are not suppressed and are passed on to the exchange; they correspond to the third figure of the dialled number. When the contact 69 slides on the fifth segment, the impulses are again suppressed until the contact pin 59*a*, which is also moved by the disc 53, is lifted up by the suitably displaced control strip 51*a*. The rest of the impulses produced while contact 69 slides on segment 55V correspond to the fourth figure of the set telephone number and is transmitted to the exchange. The impulses corresponding to the subsequent figures of the number are selected in the same way; and the telephone connection is established by transmission of these impulses to the exchange. The control strip 51*b* works in conjunction with the pin 59*b*, the strip 51*c* with the pin 59*c*, the strip 53*a* with the pin 59*a* and so on.

The position of the control strips 50, 51 and 52 does not change by the movement of the disc 53, and if it is again desired to establish the connection with the previously dialled number, it is only required to press again the push button 70. This can be repeated as many times as desired at any time after dialling, which is particularly useful if a desired number or line is engaged.

The division of the segments is not of major importance to the described invention, and other divisions than the above mentioned 10×36° can also be used.

*Cancellation Mechanism*

Fig. 8 shows an example for a cancellation mechanism, but other types of mechanisms can also be used for the same purpose.

The design of the cancellation mechanism is of no importance to the described invention. In the design according to Fig. 8, a lever 73 is fitted on the outside of the housing and mounted on the same shaft as the arm 75 and gear 79. The lever 73 controls the movement of the lever 76 and the pin 77 is pushed to the left, lifting the lever 78 and the shaft (stud) 43 on which the individual catches 44 rest; these catches are lifted upwards end the number discs 42 revert to zero position by spring action.

Similarly, all tooth segments 40 and the control strips 50, 51 and 52 also revert to their respective zero positions. The gear 79 actuates the gear transmission 80, 81 and 82. The pinion 82 is mounted on the shaft 26 and brings this shaft back into zero position, thus in a position ready for the operation of the first arm 28.

The cancellation of a dialled number setting is therefore made by operating the lever 73 which effects the lifting up of the individual levers 44 from the number discs 42. The number disappears from the aperture 45 (Fig. 5), the tooth segments 40 and the control strips 50, 51 and 52 revert to their zero positions and the shaft 26 is also brought back to its original position through operation of the gear transmission 79, 80, 81 and 82.

The operation of the device is illustrated on an example, e. g. it is desired to establish contact with the number 051284868 (nine-figure number). If it is desired to establish the connection by dialling in the conventional manner without making use of the indicating device, as is done on many standard apparatus, the lever 7 is turned into a position which effects disengaging the clutch parts 8 and 9 (Fig. 1). In this case, the whole mechanism is inoperative and the telephone connection is established in the usual way.

If it is desired to establish a telephone connection only after checking the dialled number, the lever 7 is turned into a position in which the clutch parts 8 and 9 engage. The individual figures or letters are then dialled in the usual way (without lifting the receiver). The consecutive movements of the dial effect the appropriate angular displacement of the individual tooth segments 40, number discs 42 and control strips 50, 51 and 52. The number discs 42 are fixed in their new position by the catches 44 and thereby the tooth segments and the control strips are also fixed in the set position. After all figures or letters of the telephone number have been dialled, it is visible in the aperture 45 of the housing 46, it can then be checked before the connection is established. All the control strips 50, 51, and 52 are in their working position.

After the number has been dialled and checked, the connection can be established by lifting the receiver from the rest and pressing the push button 70. The power circuit of the motor of the additional impulse producer is then closed through the action of the contacts 71 and 72 and the contact breaker 67 effects a constant supply of impulses from the contact pair 65 and 66. The impulse selecting disc 53 contacts the sliding contact 69. The first control strip 50*a* has, however, been displaced to such an extent (corresponding to "zero"), that the contact spring 56 is lifted by the pin 59*a* for a duration of ten impulses. As is shown in the schematic circuit diagram in Fig. 7, the impulse transmission to the exchange can be controlled by short circuiting or breaking the circuit with the selecting disc 53 which carries the contact springs 56.

Consecutively, the impulses corresponding to the figures 5, 1, 2, 8, etc. are passed to the exchange and finally, the control disc reaches its original position (after making one complete revolution), the current is interrupted and the impulse motor 64 remains still. This transmission of impulses to the exchange effects the connection with the previously dialled and checked number.

The number setting effected by previous dialling has not changed during this operation because the number discs and consequently also the control strips 50, 51 and 52, and all the associated parts are kept in position by the catches 44. If it is desired to reestablish the connection again, it is only necessary to press the push button 70 again and the connection is established again without it being necessary to dial the number again. If it is desired to cancel the original number setting, e. g. after finishing the conversation, the lever 73 is operated which operates the setting cancellation mechanism, making the device ready for operation with another number.

What I claim is:

1. A telephone call transmitter comprising in combination, an indicating mechanism; a rotatable dial setting said indicating mechanism and having circular finger receiver openings; a plurality of control strips; means for setting said control strips in response to said indicating mechanism; an impulse control disc; a plurality of segments rigidly connected to said impulse control disc; a plurality of members loosely arranged with respect to said control disc so as to assume different angular positions with respect to said control disc; said members engaging said control strips, respectively, in predetermined angular positions of said members with respect to said control disc; and means for breaking the electrical connections of said segments when said members are displaced into their strip-engaging position.

2. A telephone call transmitter comprising in combination, an indicating mechanism; a rotatable dial setting said indicating mechanism and having circular finger receiver openings; said indicating mechanism including a shaft and a plurality of indicating discs being supported by said shaft; a plurality of control strips; means for setting said control strips in response to said indicating discs; an impulse control disc; a plurality of segments rigidly connected to said impulse control disc; a plurality of members loosely arranged with respect to said control disc so as to assume different angular positions with respect to said control disc; said members engaging said control strips, respectively, in predetermined angular positions of said members with respect to said control disc; and means for breaking the electrical connections of said segments when said members are displaced into their strip-engaging position.

3. A telephone call transmitter comprising in combination, an indicating mechanism; a rotatable dial setting said indicating mechanism and having circular finger receiver openings; a plurality of arc-shaped control strips arranged concentrically at different radii and in groups; means for annularly displacing said control strips in response to said indicating mechanism; an impulse control disc; a plurality of segments rigidly connected to said impulse control disc; a plurality of members loosely arranged with respect to said control disc so as to assume different angular positions with respect to said control disc; said members engaging said control strips, respectively, in predetermined angular positions of said members with respect to said control disc; and means for breaking the electrical connections of said segments when said members are displaced into their strip-engaging position.

4. A telephone call transmitter, comprising in combination, a rotatable dial having circular finger receiving openings; a first shaft; a coupling between said dial and said first shaft for driving said first shaft in both directions; a second shaft arranged parallel to said first shaft; means for driving said second shaft by said first shaft when said first shaft turns in one direction only; a third shaft arranged parallel to said first shaft;

means for rotating said third shaft through a predetermined angle on each forward and backward rotation of said first shaft; a plurality of disengageable clutches on said second shaft; a plurality of arms in staggered angular relation to each other on said third shaft; said arms engaging in predetermined angular positions said clutches on said second shaft, respectively; an indicating mechanism set by said clutches on said second shaft; a plurality of control strips; means for setting said control strips in response to said indicating mechanism; an impulse control disc; a plurality of segments rigidly connected to said impulse control disc; a plurality of members loosely arranged with respect to said control disc so as to assume different angular positions of said members with respect to said control disc; and means for breaking the electrical connections of said segments when said members are displaced into their strip-engaging position.

5. A telephone call transmitter, comprising in combination, a rotatable dial having circular finger receiving openings; a first shaft; a clutch coupling said first shaft with said dial and including a driving member and a driven member, said driving member being driven by said dial in both directions; means for engaging and disengaging said clutch members; a second shaft arranged parallel to said first shaft; means for driving said second shaft by said first shaft when said first shaft turns in one direction only; a third shaft arranged parallel to said first shaft; and means for rotating said third shaft through a predetermined angle on each forward and backward rotation of said first shaft; a plurality of disengageable clutches on said second shaft; a plurality of arms in staggered angular relation to each other on said third shaft, said arms engaging in predetermined angular positions said clutches on said second shaft, respectively; an indicating mechanism set by said clutches on said second shaft; a plurality of control strips; means for setting said control strips in response to said indicating mechanism; an impulse control disc; a plurality of segments rigidly connected to said impulse control disc; a plurality of members loosely arranged with respect to said control disc so as to assume different angular positions with respect to said control disc; said members engaging said control strips, respectively, in predetermined angular positions of said members with respect to said control disc; and means for breaking the electrical connections of said segments when said members are displaced into their strip-engaging position.

6. A telephone call transmitter comprising in combination, an indicating mechanism; a rotatable dial setting said indicating mechanism and having circular finger receiving openings; two contacts connected to an exchange; an impulse control disc; a ring and a plurality of segments rigidly connected to said control disc and electrically connected, respectively, to said contacts; a plurality of control strips; means for setting said control strips in response to said indicating mechanism; an impulse control disc; a plurality of members loosely arranged with respect to said control disc so as to assume different angular positions with respect to said control disc; said members engaging said control strips, respectively, in predetermined angular positions of said members with respect to said control disc; said members establishing electrical connections between said ring and said segments, respectively, in certain angular positions; and means for breaking the electrical connections between said ring and said segments, respectively, when said members are in their strip-engaging position.

7. A telephone call transmitter comprising in combination, an indicating mechanism; a rotatable dial setting said indicating mechanism and having circular finger receiving openings; two contacts connected to an exchange; a motor driven member for separating said contacts at predetermined intervals of time; an impulse control disc; a ring and a plurality of segments rigidly connected to said control disc and electrically connected, respectively, to said contacts; a plurality of control strips; means for setting said control strips in response to said indicating mechanism; an impulse control disc; a plurality of members loosely arranged with respect to said control disc so as to assume different angular positions with respect to said control disc; said members engaging said control strips, respectively, in predetermined angular positions of said members with respect to said control disc; said members establishing electrical connections between said ring and said segments, respectively, in certain angular positions; and means for breaking the electrical connections between said ring and said segments, respectively, when said members are in their strip-engaging position.

8. A telephone call transmitter comprising in combination, an indicating mechanism; a rotatable dial setting said indicating mechanism and having circular finger receiving openings; two contacts connected to an exchange; an impulse control disc; a ring and a plurality of segments rigidly connected to said control disc and electrically connected, respectively, to said contacts; a plurality of control strips; means for setting said control strips in response to said indicating mechanism; an impulse control disc; a plurality of members loosely arranged with respect to said control disc so as to assume different angular positions with respect to said control disc; said members engaging said control strips, respectively, in predetermined angular positions of said members with respect to said control disc; said members establishing electrical connections between said ring and said segments, respectively, in certain angular positions; means for breaking the electrical connections between said ring and said segments, respectively, when said members are in their strip-engaging position; an electromotor; a member driven by said motor for separating said contacts at predetermined intervals of time; and means driven by said motor for driving said control disc.

9. A telephone call transmitter comprising in combination, an indicating mechanism; a rotatable dial setting said indicating mechanism and having circular finger receiving openings; two contacts connected to an exchange; an impulse control disc; a ring and a plurality of segments rigidly connected to said control disc and electrically connected, respectively, to said contacts; a plurality of control strips; means for setting said control strips in response to said indicating mechanism; an impulse control disc; a plurality of members loosely arranged with respect to said control disc so as to assume different angular positions of said members with respect to said control disc; said members establishing electrical connections between said ring and said segments, respectively, in certain angular positions; means for breaking the electrical connections between said ring and said segments, respectively, when said members are in their strip-engaging position; an electromotor; a member driven by said motor for separating said contacts at predetermined intervals of time; means driven by said motor for driving said control disc; and a hand operated switch for starting said electromotor.

EMANUEL GOLDBERGER.

REFERENCES CITED

The following references are of record in the file of this patent:

16

UNITED STATES PATENTS

| Number | Name | Date |
|---|---|---|
| 1,927,413 | Morin | Sept. 19, 1933 |
| 2,116,372 | Weld | May 3, 1938 |
| 2,253,650 | Richard | Aug. 26, 1941 |
| 2,346,305 | Hickman | Apr. 11, 1944 |

FOREIGN PATENTS

| Number | Country | Date |
|---|---|---|
| 44,328 | France | Dec. 24, 1934 |